No. 716,785. Patented Dec. 23, 1902.
E. H. TAYLOR.
SHIPPING CASE FOR SAWS.
(Application filed Apr. 2, 1902.)
(No Model.)
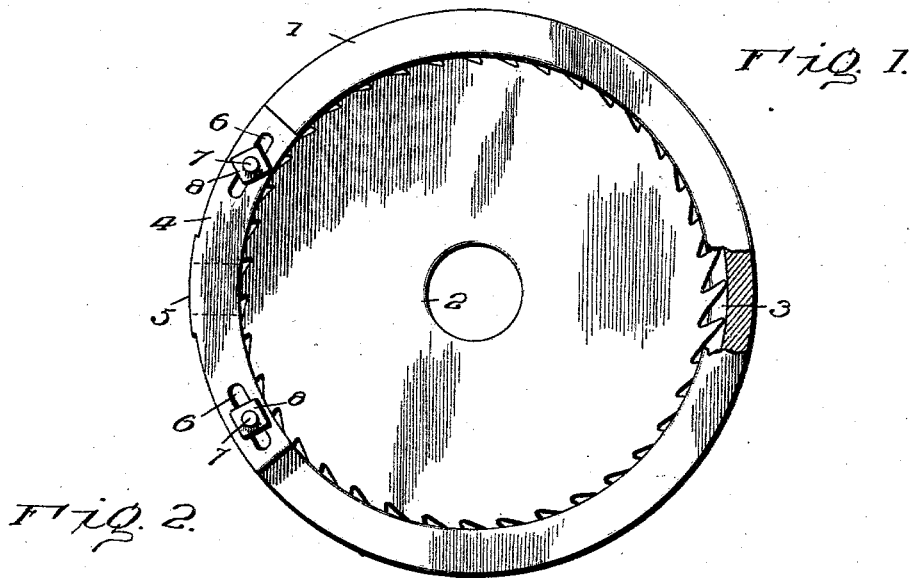
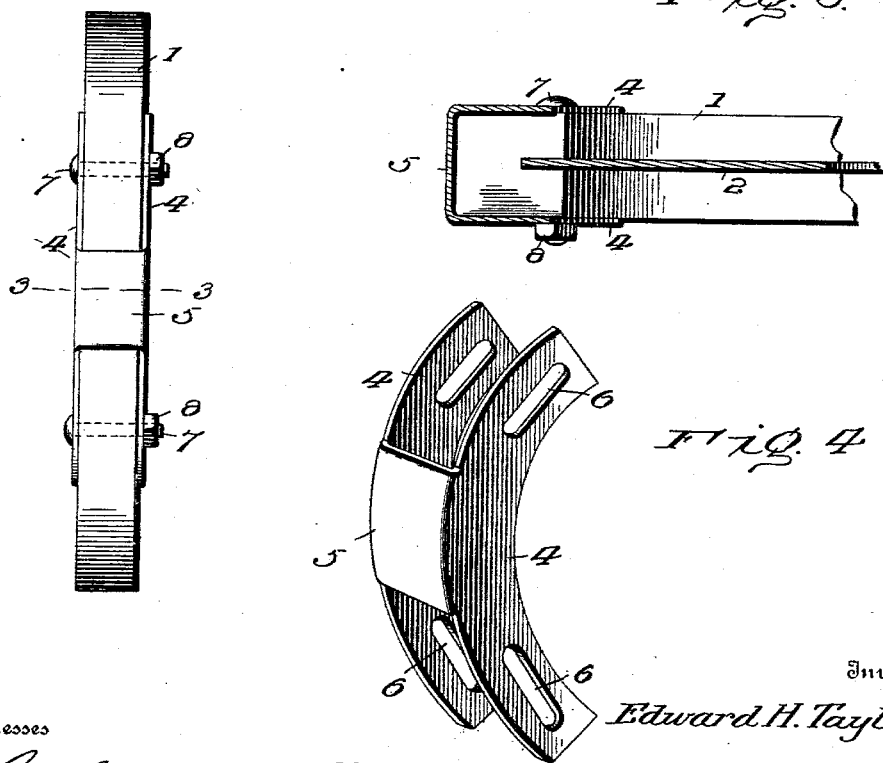
Inventor
Edward H. Taylor
Witnesses
By
Attorneys

UNITED STATES PATENT OFFICE.

EDWARD H. TAYLOR, OF STERLING, ARKANSAS.

SHIPPING-CASE FOR SAWS.

SPECIFICATION forming part of Letters Patent No. 716,785, dated December 23, 1902.

Application filed April 2, 1902. Serial No. 101,095. (No model.)

*To all whom it may concern:*

Be it known that I, EDWARD H. TAYLOR, a citizen of the United States, residing at Sterling, in the county of Chicot and State of Arkansas, have invented certain new and useful Improvements in Shipping-Cases for Saws; and I do hereby declare the following to be a full, clear, and exact description of the invention, such as will enable others skilled in the art to which it appertains to make and use the same.

This invention has relation to a shipping-case or holder for circular saws, and has for its object to provide a simple, cheap, and durable case in which the saw is held and protected from injury in transit and by which ease of handling and economy in shipment are insured.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side view of a shipping-case embodying my invention, showing a saw placed therein for shipment. Fig. 2 is an edge view looking toward the clip or coupling. Fig. 3 is a transverse section on line 3 3 of Fig. 2. Fig. 4 is a perspective view of the coupling.

The case or holder 1 comprises a split ring or band, preferably formed of wood bent into form and of an internal diameter slightly less than the diameter of the circular saw 2 which it is to inclose. This ring or band is provided on its inner side with a groove or channel 3 to receive the toothed edge of the saw, the walls of which channel hold the saw from outward displacement. The ends of the ring or band are connected by a coupling consisting of side plates 4, bearing upon opposite sides of the ring, and a bridge-piece 5, which extends across the opening in the periphery of the ring and connects the outer longitudinal edges of said plates. The plates 4 are provided at their ends with elongated slots 6 to receive bolts 7, extending transversely through the ring, to which bolts are applied nuts 8, which clamp the parts in place. The slots 6 are of such length as to permit the ring to be expanded to receive the saw without removing the coupling and then contracted to hold the saw confined.

In placing the saw within the case the nuts are loosened up and the ends of the case forced apart to expand it, so as to admit of the saw being inserted in the groove 3 from either side of the case, the bolts sliding in the slots 6 when the ends of the case are spread apart. After the saw has been inserted the ends of the case are brought as closely together as possible, and then the nuts are screwed up tight to hold the case in contracted condition. When the parts are thus connected up, it will be seen that the saw will be securely confined and cannot possibly slip out, as upon the contraction of the case the walls of the groove 3 will hold it from outward movement. The mode of removing the saw will be readily understood from the foregoing description.

The case may be made of various sizes to suit different sizes of saws.

Owing to the extreme lightness of the case the saw may be conveniently rolled about and handled and shipped at less cost than when boxed up, and economy is secured in the construction of the case, as less material is required than where boxing is resorted to. The case also permits of the free inspection of the saw from the exterior, while protecting it from injury.

Having thus described the invention, what is claimed as new is—

1. A shipping-case for circular saws, comprising a continuous peripheral portion bent into approximately circular form and adapted to be contracted to bring its ends together in alinement with each other, a groove upon the inner circumference of said case intermediate the sides thereof to inclose and confine the edge portion of the saw and prevent displacement of same, and means for holding the case in its contracted condition, substantially as set forth.

2. In a shipping-case for circular saws having end portions adapted to be brought together, a coupling comprising side plates to bear against the sides of and close the space between the said end portions from the sides, securing means connecting the plates and passing through the corresponding end portions of the case and clamping the plates to the case, a bridge-piece uniting the side plates intermediate their ends closing the aforementioned space from the outer side of the case, substantially as specified.

3. A shipping-case for circular saws comprising an expansible split ring, a coupling connecting the ends of the ring for holding the ring in contracted condition to confine the saw, said coupling comprising side plates bearing upon opposite sides of the ring and a bridge-piece uniting said plates and closing the space between the ends of the ring, and means for fastening said coupling, substantially as set forth.

In testimony whereof I affix my signature in presence of two witnesses.

EDWARD H. TAYLOR. [L. S.]

Witnesses:
  P. S. STOWIT,
  H. W. GRIMES.